US012639306B2

(12) United States Patent
Willems et al.

(10) Patent No.: US 12,639,306 B2
(45) Date of Patent: May 26, 2026

(54) DATABASE OPERATOR CLAUSE VARIABLE CALCULATION IN DISTRIBUTED SYSTEMS

(71) Applicant: SAP SE, Walldorf (DE)

(72) Inventors: Paul Willems, Heidelberg (DE); Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/732,241

(22) Filed: Jun. 3, 2024

(65) Prior Publication Data

US 2025/0371005 A1 Dec. 4, 2025

(51) Int. Cl.
G06F 16/2453 (2019.01)
G06F 16/2458 (2019.01)
(52) U.S. Cl.
CPC .... G06F 16/24542 (2019.01); G06F 16/2471 (2019.01)
(58) Field of Classification Search
CPC ............. G06F 16/245; G06F 16/24524; G06F 16/2453; G06F 16/224532; G06F 16/24532; G06F 16/24535; G06F 16/24537; G06F 16/2454; G06F 16/24542; G06F 16/24544; G06F 16/24545; G06F 16/24547; G06F 16/2471
See application file for complete search history.

(56) References Cited

U.S. PATENT DOCUMENTS

2008/0147627 A1* 6/2008 Natkovich .......... G06F 16/2454
                                                    707/E17.05
2017/0024434 A1* 1/2017 Behnen ............. G06F 16/24534

OTHER PUBLICATIONS w3schools.com "SQL COUNT() Function"; w3schools SQL standard; Dated by Internet Archive: Aug. 28, 2023; https://www.w3schools.com/sql/sql_count.asp (Year: 2023).*

* cited by examiner

*Primary Examiner* — Amanda L Willis
(74) *Attorney, Agent, or Firm* — SCHWEGMAN LUNDBERG & WOESSNER, P.A.

(57) ABSTRACT

In an example embodiment, a query plan is modified/generated to insert a new shared subplan relation between the operator-at-issue and its input (e.g., the child operator). The shared subplan relation has two references, one of which is connected to the operator-at-issue and one of which is connected to an aggregation operator. A new operator is then inserted as a parent of the aggregation operator. This new operator sums up incoming counts and updates the resultant sum as a stored variable (e.g., as a session variable).

18 Claims, 7 Drawing Sheets

100

PROJECT *106*

SELECT X LIMIT LM
{OFFSET OFF]
TOTAL ROWCOUNT
*102*

TABLE SCAN *104*

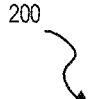
200
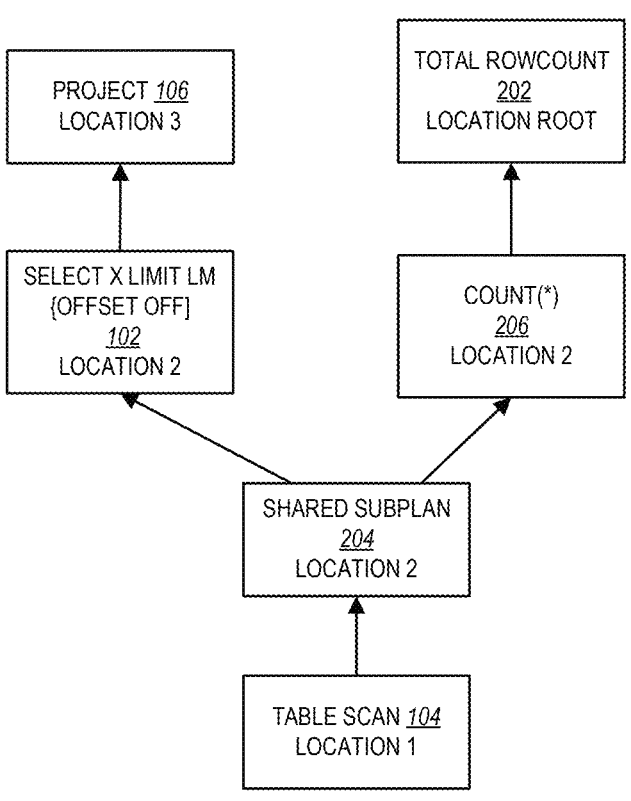
*FIG. 2*

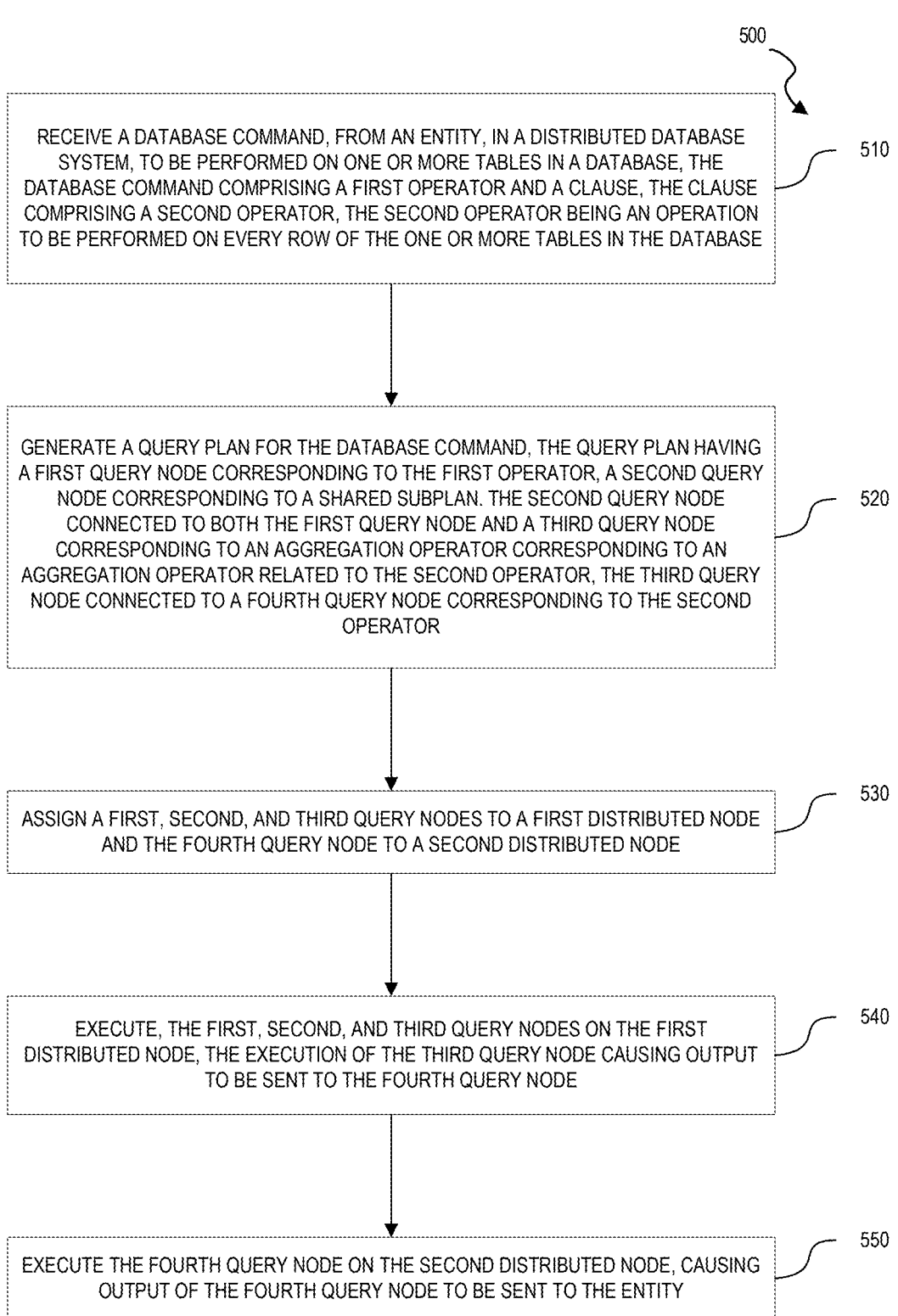

500

RECEIVE A DATABASE COMMAND, FROM AN ENTITY, IN A DISTRIBUTED DATABASE SYSTEM, TO BE PERFORMED ON ONE OR MORE TABLES IN A DATABASE, THE DATABASE COMMAND COMPRISING A FIRST OPERATOR AND A CLAUSE, THE CLAUSE COMPRISING A SECOND OPERATOR, THE SECOND OPERATOR BEING AN OPERATION TO BE PERFORMED ON EVERY ROW OF THE ONE OR MORE TABLES IN THE DATABASE

510

GENERATE A QUERY PLAN FOR THE DATABASE COMMAND, THE QUERY PLAN HAVING A FIRST QUERY NODE CORRESPONDING TO THE FIRST OPERATOR, A SECOND QUERY NODE CORRESPONDING TO A SHARED SUBPLAN. THE SECOND QUERY NODE CONNECTED TO BOTH THE FIRST QUERY NODE AND A THIRD QUERY NODE CORRESPONDING TO AN AGGREGATION OPERATOR CORRESPONDING TO AN AGGREGATION OPERATOR RELATED TO THE SECOND OPERATOR, THE THIRD QUERY NODE CONNECTED TO A FOURTH QUERY NODE CORRESPONDING TO THE SECOND OPERATOR

520

ASSIGN A FIRST, SECOND, AND THIRD QUERY NODES TO A FIRST DISTRIBUTED NODE AND THE FOURTH QUERY NODE TO A SECOND DISTRIBUTED NODE

530

EXECUTE, THE FIRST, SECOND, AND THIRD QUERY NODES ON THE FIRST DISTRIBUTED NODE, THE EXECUTION OF THE THIRD QUERY NODE CAUSING OUTPUT TO BE SENT TO THE FOURTH QUERY NODE

540

EXECUTE THE FOURTH QUERY NODE ON THE SECOND DISTRIBUTED NODE, CAUSING OUTPUT OF THE FOURTH QUERY NODE TO BE SENT TO THE ENTITY

DATABASE OPERATOR CLAUSE VARIABLE CALCULATION IN DISTRIBUTED SYSTEMS

BACKGROUND

A database may be configured to store a plurality of electronic data records. These data records may be organized, in accordance with a database schema, into various database objects including, for example, one or more database tables. The database is coupled with a database management system (DBMS), which may be configured to support a variety of database operations for accessing the data records stored in the database. These database operations may include, for example, structured query language (SQL) queries and/or the like.

BRIEF DESCRIPTION OF DRAWINGS

The present disclosure is illustrated by way of example and not limitation in the figures of the accompanying drawings, in which like references indicate similar elements.

FIG. 2 is a diagram illustrating a query plan modified using the new operator, in accordance with an example embodiment.

FIG. 5 is a flowchart of a method for generating and executing a query plan in a distributed system, in accordance with an example embodiment.

DETAILED DESCRIPTION

Figure 1:
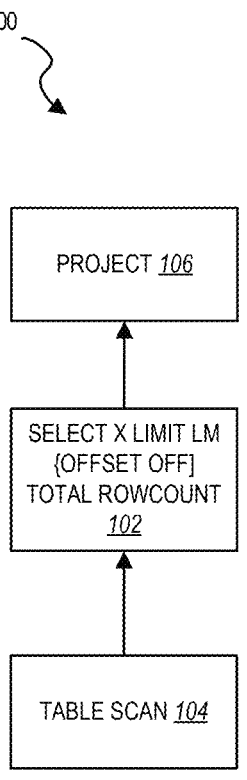
FIG. 1 is an example of a query plan, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Various operations may be performed on data stored in databases. Specifically, it is common to perform operations that include clauses that modify the corresponding operation. For example, a SELECT operation acts to select certain values from a table. Various clauses could be added to this operation to filter the results. For example, the SELECT operation could include a <having_clause> that specifies that the data returned must contain the specified value or values. Thus, a SELECT operation could specify to select employee data from an employee table, and a having clause could specify that the employee data should be for employees' data having a "sales" value in a "department" column (thus selecting employee data for employees in the sales department, but not from other departments).

Another example of a clause is a limit clause. The limit clause acts to limit the overall number of returned values. Thus, the SELECT operation above could be modified so that at most 15 employee records are returned. An offset clause is another example of a modifying clause for a SELECT operation. The offset clause skips a specified number of pieces of data before selecting ones for return. Thus, the SELECT operation above could be modified so that the first 20 employee records are skipped.

Of course, various clauses could be combined in a single operation. For example, a SELECT operation could be specified with clauses to return employee data from an employee table, and a having clause could specify that the employee data should be for employees' data having a "sales" value in a "department" column and having a limit clause limiting the number of returned pieces of data to 15, and having an offset clause indicating that the first 20 employee records should be skipped.

In some scenarios, a clause variable may be specified that is orthogonal to the underlying clause/operator. This would include a variable that is dependent on the traversal of every row of a table even though its underlying clause/operator is not. A specific example of this is the TOTAL ROWCOUNT variable. A database query can include this variable at the end of, for example, a LIMIT or OFFSET clause. The TOTAL ROWCOUNT variable indicates that it should be returned with a value indicative of the total number of rows in an intermediate result computed during computation of the underlying cause/operator. This would be in spite of the fact that the operator itself is not applied to the total number of tows in the table. For example, a table may contain one hundred rows If a SELECT operator is specified with a limit clause indicating an offset of twenty, then the SELECT operator is not even performed on the first twenty rows, and yet the TOTAL ROWCOUNT variable needs to be populated with the value one hundred and not the value eighty or some other value. In other words, the TOTAL ROWCOUNT variable is a measurement of the total number of rows the operator would have been applied to if the OFFSET clause (and/or a LIMIT clause) were not present. Notably, in other operators that are extended with a TOTAL ROWCOUNT clause, it still may be necessary to process all incoming rows. If, there was a LIMIT with an ORDER BY, then the ORDER BY would still need to sort all of its inputs, to be able to produce the LIMIT smallest ones.

In some example embodiments the TOTAL ROWCOUNT calculation can be stored as a session variable. Here, the result of the operator would be the data set that meets the condition of the operator and all of its clauses, but separately a TOTAL ROWCOUNT session variable can be populated with the results of counting all the rows in the table, and this session variable can be accessed via a function, such as a SQL function. But this is just one possible way of providing such a feature. An alternative would be to present it as a separate result for the initial operator. The presently described solution would work equally well with either embodiment.

The challenge is how to implement TOTAL ROWCOUNT in a relational query execution engine in an easy, efficient, and maintainable way.

First, the feature is a diversion from standard relational algebra, where the result of an operator is a single table/relation. Having multiple results can complicate processing. Furthermore, the computation of LIMIT/OFFSET clauses is naturally pushed down or fused into other operators for performance.

In an ORDER BY . . . LIMIT lim OFFSET off, the straightforward way to first compute the full sorted result and then apply the limit is obviously suboptimal. One will want to apply the limit as early as possible. There are many algorithms for sorting, and each would handle this differently. For instance:

Any algorithm that is based on merging sorted parts can apply the LIMIT/OFFSET to each sorted part, as it suffices to keep only the first off+lim elements per part.

For a HeapSort-kind of algorithm, one can employ a max-heap; as soon as that has off+lim elements one can immediately throw away any incoming row whose key element exceeds the current maximal element of the heap.

Another relational operator that can benefit from such an optimized implementation is GROUP BY. If there is a LIMIT following the GROUP BY, then the grouping algorithm (of which there are also many) can start ignoring incoming rows that don't belong to an existing group as soon as it has started offset and limit groups.

And then there is the case of a distributed system, where multiple nodes can perform part of the processing to speed execution time and balance loads. If the row set on which the LIMIT/OFFSET comes from multiple hosts, then similarly to merge-based sorting above it pays to already limit the results on each host to off+lim rows and only send those over the network, instead of sending all rows and only limiting at the destination. Note this applies both with and without an ORDER BY in the query.

The point in the above is that a naïve approach to implement the TOTAL ROWCOUNT feature might entail adding special coding to any of these algorithms to count inputs, and also extra code to perform a distributed summation of the local row counts. This could quickly lead to a software management nightmare.

Relational database commands are converted to query plans for execution. These plans can be visualized graphically, although they are often stored at the computing level in a non-graphical format. FIG. 1 is an example of a query plan 100, in accordance with an example embodiment. Here, a SELECT operator is represented by node 102, a child operator, such as a TABLE SCAN operator, is represented by node 104, and a parent operator, such as a PROJECT operator, is represented by node 106. Here the TABLE SCAN operator and PROJECT operator are merely examples of child and parent operators, and the specific child and parent operators involved are not really relevant. The key, however, is that the TOTAL ROWCOUNT operator is specified in node 102. For purposes of this discussion, the operator associated with node 104 (here the SELECT operator) can be generically referred to as the operator-at-issue (namely, the operator on which the solution is applied).

More particularly, as long as the system was not distributed, one could insert a simple generic counting operator (TOTAL ROWCOUNT) below the relation that needs to apply the LIMIT/OFFSET which passes rows along and updates the global session variable at the end. But with distribution, one also needs to aggregate these counters from each node.

As such, in an example embodiment, the query plan is modified to insert a new shared subplan relation between the operator-at-issue and its input (e.g., the child operator). The shared subplan relation has two references, one of which is connected to the operator-at-issue and one of which is connected to an aggregation operator. A new operator is then inserted as a parent of the aggregation operator. This new operator sums up incoming counts and updates the resultant sum as a stored variable (e.g., as a session variable).

This solution allows for implementation using only one new relational operator while otherwise employing existing relational operators. It is orthogonal in the sense that any optimized algorithms of the kind outlined above that the engine implements—or is going to implement in the future—are able to support operations like TOTAL ROWCOUNT out of the box without any local modifications to the algorithm.

The outlined solution is applicable in any relational engine that has the following prerequisites:

(i) Support for Shared Subplan relational operators (aka Common Table Expressions), i.e., the means to refer to an intermediate result at multiple places in the plan.

(ii) Where one can assume the output of query optimization is a query graph out of relational operator nodes. Edges between nodes depict data flow of rows/tuples. Each node may have a location attribute to specify the node on which computation shall take place. If locations of two connected operators differ, an implicit Distributed Exchange (Dxchg) is inserted between them to take care of sending data over the network.

FIG. 2 is a diagram illustrating a query plan 200 modified using the new operator, in accordance with an example embodiment. Here, the query plan 100 of FIG. 1 has been modified. Specifically, node 102 has been modified to remove the TOTAL ROWCOUNT operator. Instead, this operator is created as a new node 202. More specifically, shared subplan relation 204 is inserted between nodes 102 and node 104. This shared subplan relation 204 has one reference to node 102 and another reference to node 206, which represents an aggregation operator (such as count). Since the query plan 200 operates in a distributed system, each node can be assigned a location. The location is indicative of the distributed node (not to be confused with the query plan node) on which the underlying operation will be executed. Here, for example, the operator associated with node 104 may be executed at location 1, the operator associated with node 102 may be executed at location 2, and the operator associated with node 106 may be executed at location 3. The shared subplan relation 204 and the aggregation operator (associated with node 206) may be assigned the same location as the operator-at-issue, here the operator associated with node 102, specifically location 2. This ensures that only the local total row counts in a distributed system are sent over the network to the root node.

The new operator may then be inserted as node 202, a parent of node 206, with a location assigned as a root node of the distributed system (the node from where final results are sent to the client).

Figure 3:
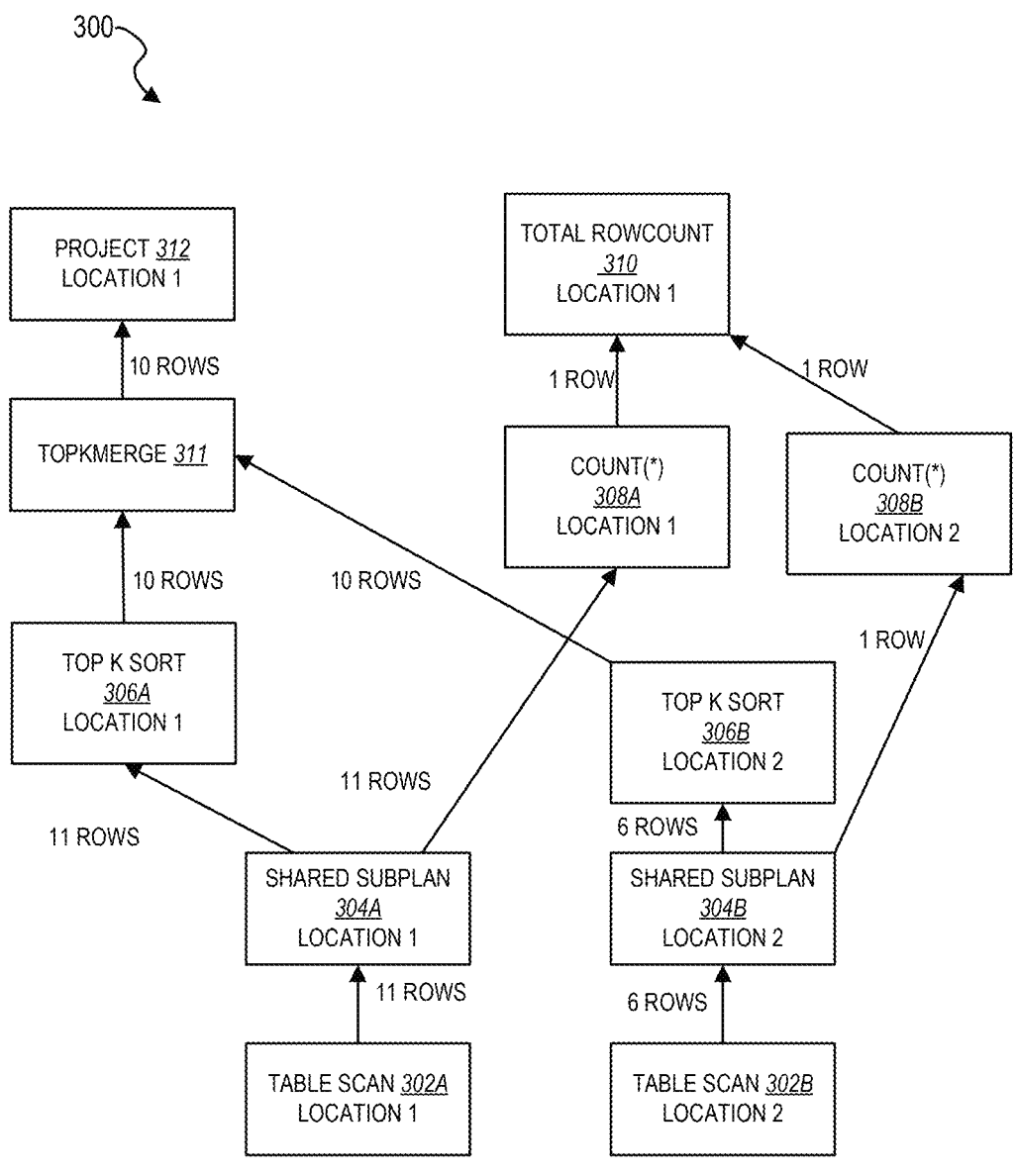
FIG. 3 is a diagram illustrating an example of a distributed query plan in accordance with an example embodiment.

FIG. 3 is a diagram illustrating an example of a distributed query plan 300 in accordance with an example embodiment. Here, the operators may be distributed in a different way than in FIG. 2, but the overall result is the same. This figure also shows the number of rows being transmitted between each node, to aid in understanding the advantages of the present solution. Here, assume a table with seventeen rows is provided as input. A tablescan operator is performed on two different distributed nodes, once at location 1 and once at location 2. Here, tablescan operator 302A, operating at location 1, processes eleven of the seventeen rows and tablescan operator 302B, operating at location 2, processes the remaining six of the seventeen rows. Tablescan operator 302A passes the eleven rows to shared subplan 304A, operating at location 1, while tablescan operator 302B passes the six rows to shared subplan 304B, operating at location 2.

Shared subplan 304A passes its eleven rows to both a top K sort operator 306A (the operator-at-issue) operating at location 1 and the aggregate operator 308A (e.g., count) operating at location 1. Shared subplan 304B passes its six rows to both a top K sort operator 306B (the operator-at-issue) operating at location 2 and the aggregate operator 308B (e.g., count) operating at location 2. Each aggregate operator 308A, 308B then passes a single row, specifically the count of the rows in the portion of the table it was passed, to a single total rowcount operator 310, here at location 1 (assuming location 1 is the root). Each top K sort operator 306A, 306B pass their respective outputs to top K merge operator 311, operating at location 1. Top K merge operator 311 merges the results from the top K sort operators 306A, 306B, and sends the merged results to the project operator 312, here operating at location 1 This may include passing a total of ten rows combined from both the top K sort operator 306A and 306B.

While the TOTAL ROWCOUNT operator is specifically presented here as an example of an operator on which the present solution can be applied, there is no requirement that the present solution be limited to the TOTAL ROWCOUNT operator. The present solution can be applied to any operator that performs some sort of calculation that requires the examination of every row of an intermediate result of the execution of the operator and that is specified as an option or variable or another operator (the operator-at-issue). For purposes of this disclosure, such operators that perform some sort of calculation that requires the examination of every row of a table and that are specified as an option or variable or another operator can be termed clause variable calculations. Examples of clause variable calculations include the aforementioned TOTAL ROWCOUNT operator, as well as operators such as MIN, MAX, AVG, and the like.

Examples of operators-at-issue presented here include specifically the SELECT operator and the TOP K SORT operator, but the present solution may be applied to any operator to which a clause variable calculation can be attached. That will largely be implementation dependent as different versions of query languages and different relational database management systems can choose which operators allows such clause variable calculations. Nevertheless, nothing in this disclosure shall be interpreted as limiting the scope of protection to any particular operator, unless expressly specified in the claims.

Figure 4:
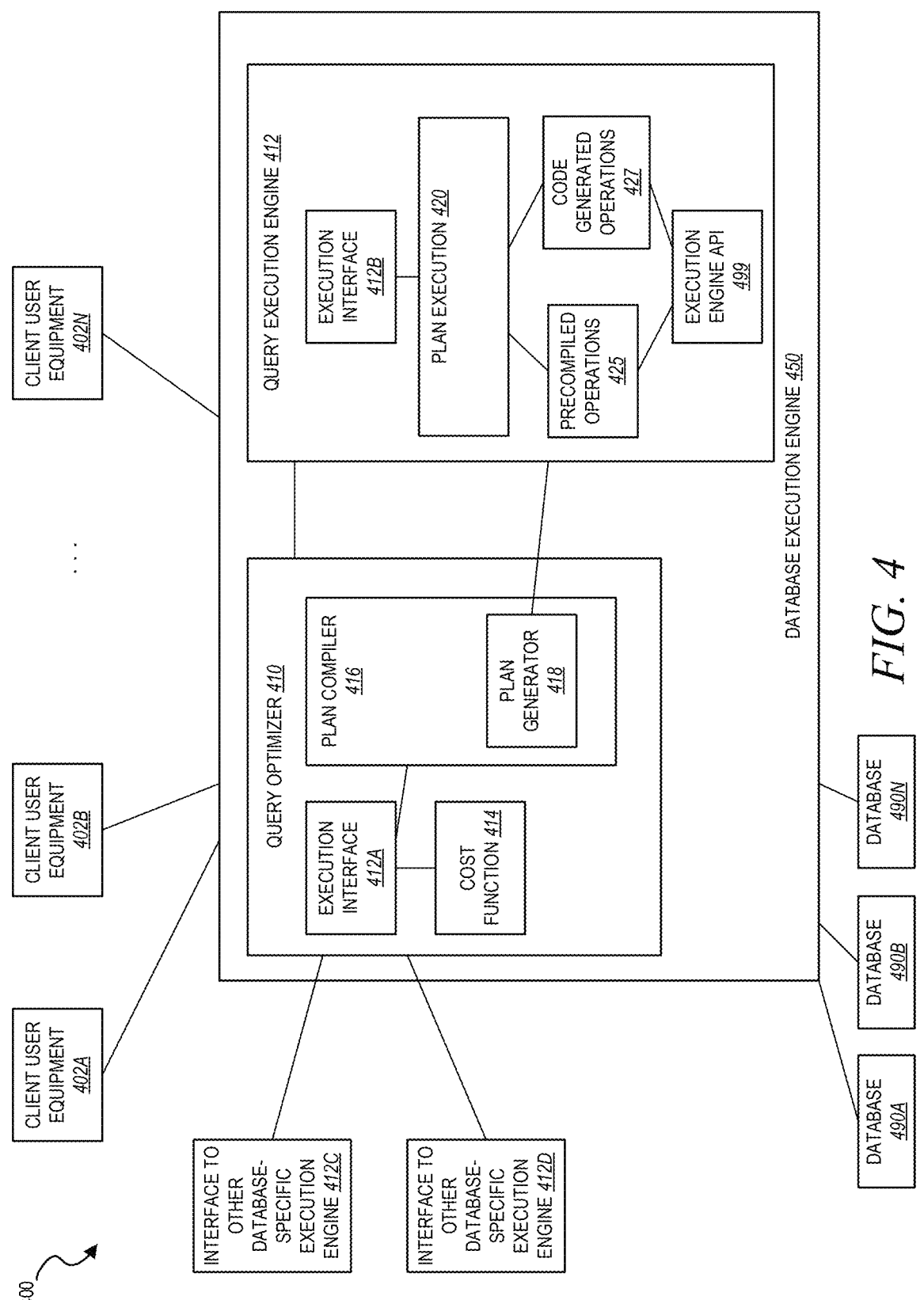
FIG. 4 is a block diagram illustrating an example of a database management system, in accordance with some example implementations.

FIG. 4 is a block diagram illustrating an example of a database management system 400, in accordance with some example implementations.

The database management system 400 may include one or more user equipment 402A, 402B, . . . , 402N, such as a computer, a smartphone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 490A, 490B, . . . , 490N, and/or to receive responses to those queries.

In the example of FIG. 4, the databases 490A, 490B, . . . , 490N represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 402A, 402B, . . . , 402N may send a query via an execution engine 450 to the database layer 490A, 490B, . . . , 490N, which may represent a persistence and/or storage layer where database tables may be stored and/or queried. The query may be sent via a connection, such as a wired and/or wireless connection (e.g., the Internet, cellular links, WiFi links, and/or the like).

The database execution engine 450 may include a query optimizer 410, such as a SQL optimizer and/or another type of optimizer, to receive at least one query from a user equipment and generate a query plan (which may be optimized) for execution by the execution engine 412. The query optimizer 410 may receive a request, such as a query, and then form or propose an optimized query plan. The query plan (which may be optimized) may be represented as so-called "query algebra" or "relational algebra."

For example, SELECT Columns from Table A and Table B, and perform an INNER JOIN on Tables A and B may represent a query received by the database execution engine 450 including the query optimizer 410. There may be several ways of implementing execution of this query. As such, the query plan may offer hints or propose an optimum query plan with respect to the execution time of the overall query. To optimize a query, the query plan optimizer 410 may obtain one or more costs for the different ways the execution of the query plan can be performed. The costs may be obtained via the execution interface 412A from a cost function 414, which responds to the query optimizer 410 with the cost(s) for a given query plan (or portion thereof), and these costs may be in terms of execution time at the database layer 490A, 490B, . . . , 490N, for example.

The query optimizer 410 may form an optimum query plan, which may represent a query algebra, as noted above. To compile a query plan, the query optimizer 410 may provide the query plan to the query plan compiler 416 to enable compilation of some, if not all, of the query plan. The query plan compiler 416 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represents code for executing the query plan, and this code may be provided to the plan generator 418, which interfaces the query execution engine 412.

In some implementations, the query optimizer 410 may optimize the query plan by compiling and generating code. Moreover, the query optimizer 410 may optimize the query plan to enable pipelining during execution.

In some implementations, the query optimizer 410 may be configured to select other execution engines. For example, the query optimizer 410 may select via interface 412C, an execution engine configured specifically to support a row-store database or an ABAP type database, or the query optimizer 410 may select, via interface 412D, an execution engine configured specifically to support a column-store type database. In this way, the query optimizer 410 may select whether to use the universal database execution engine 450 or legacy (e.g., database-specific) execution engines (available via interfaces 412C/D, for example).

The query execution engine 412 may receive from the plan generator 418, compiled code to enable execution of the optimized query plan, although the query execution engine may also receive code or other commands directly from a higher-level application or other device, such as user equipment 402A-N.

The query execution engine 412 may then forward, via an execution interface 412B, the code to a plan execution engine 420. The plan execution engine may then prepare the plan for execution, and this query plan may include pre-compiled code 425 and/or generated code 427. When the code for the query plan is ready for execution during runtime, the query execution engine 412 may step through the code performing some of the operations within the database execution engine 450 and sending some of the operations (or commands in support of an operation, such as a read, write, and/or the like) to the execution engine application programming interface (API) 499 for execution at one or more of databases layers 490A-N.

In an example embodiment, the plan generator 418 may be modified to generate a query plan that comprises a new shared subplan relation between the operator-at-issue and its input (e.g., the child operator). The shared subplan relation has two references, one of which is connected to the operator-at-issue and one of which is connected to an aggregation operator. A new operator is then inserted as a parent of the aggregation operator. This new operator sums up incoming counts and updates the resultant sum as a stored variable (e.g., as a session variable).

It should be noted that this generation of the query plan can occur in different ways, depending upon implementation. In some example embodiments, a query plan can be generated based on a traditional method for generating a query plan (i.e., without the presently-described solution) and then that query plan may be modified to modify a node associated with the operator-at-issue (e.g., to remove the TOTAL ROWCOUNT operator from it) and to insert the query plan nodes specified in the solution (e.g. the shared subplan relation, the aggregation operator, and the new operator). In other example embodiments, the query plan is generated from the ground up using the presently-described solution, e.g., so that the node associated with the operator-at-issue does not contain the TOTAL ROWCOUNT operator from the start). In either type of embodiment, the end result is a query plan that provides the additional query plan nodes specified in the presently described solution and has a node corresponding to an operator-at-issue that does not contain a clause variable calculation.

FIG. 5 is a flowchart of a method 500 for generating and executing a query plan in a distributed system, in accordance with an example embodiment.

At step 510, a database command is received, from an entity, in a distributed database system, to be performed on one or more tables in a database, the database command comprising a first operator and a clause, the clause comprising a second operator, the second operator being an operation to be performed on every row of an intermediate result of the execution of the operator.

At step 520, a query plan for the database command is generated, the query plan having a first query node corresponding to the first operator, a second query node corresponding to a shared subplan, the second query node connected to both the first query node and a third query node corresponding to an aggregation operator, corresponding to an aggregation operator related to the second operator, the third query node connected to a fourth query node corresponding to the second operator]

At step 530, the first, second, and third query nodes are assigned to a first distributed node and the fourth query node is assigned to a second distributed node.

At step 540, the first, second, and third query nodes are executed on the first distributed node, the execution of the third query node causing output to be sent to the fourth query node.

At step 550, the fourth query node is executed on the second distributed node, causing output of the fourth query node to be sent to the entity.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1 is a system comprising: at least one hardware processor and a computer-readable medium storing instructions that, when executed by the at least one hardware processor, cause the at least one hardware processor to perform operations comprising: receiving a database command, from an entity, in a distributed database system, to be performed on one or more tables in a database, the database command comprising a first operator and a clause, the clause comprising a second operator, the second operator being an operation to be performed on an intermediate result of execution of the operator; generating a query plan for the database command the query plan having a first query node corresponding to the first operator, a second query node corresponding to a shared subplan, the second query node connected to both the first query node and a third query node corresponding to an aggregation operator corresponding to an aggregation operator related to the second operator; the third query node connected to a fourth query node corresponding to the second operator; assigning a first, second, and third query nodes to a first distributed node and the fourth query node to a second distributed node; executing, the first, second, and third query nodes on the first distributed node, the execution of the third query node causing output to be sent to the fourth query node; and executing the fourth query node on the second distributed node, causing output of the fourth query node to be sent to the entity.

In Example 2, the subject matter of Example 1 comprises, wherein the database command further comprises a limit clause.

In Example 3, the subject matter of Examples 1-2 comprises, wherein the database command further comprises an offset clause.

In Example 4, the subject matter of Examples 1-3 comprises, wherein the first operator is a select operator.

In Example 5, the subject matter of Examples 1-4 comprises, wherein the first operator is a group by operator.

In Example 6, the subject matter of Examples 1-5 comprises, wherein the first operator is a sort operator.

In Example 7, the subject matter of Examples 1-6 comprises, wherein the second operator is a total rowcount operator.

In Example 8, the subject matter of Examples 1-7 comprises, wherein the assigning comprises assigning a first instance of the first query node to a first distributed node and a second instance of the first query node to a second distributed node.

In Example 9, the subject matter of Examples 1-8 comprises, wherein the fourth query node stores the output of the fourth query node in a session variable that is accessible to the entity.

In Example 10, the subject matter of Examples 1-9 comprises, wherein the fourth query node sends the output of the fourth query node directly to the entity in a message that also contains output that is based on output of the first query node.

In Example 11, the subject matter of Examples 1-10 comprises, wherein the generating a query plan comprises: receiving a first version of the query plan having the first node, the first node comprising the first operator and the second operator; adding the second and third nodes to the first version of the query plan; and removing the second operator from the first node and placing it into the fourth node of the query plan.

Example 12 is a method comprising: receiving a database command, from an entity, in a distributed database system, to be performed on one or more tables in a database, the database command comprising a first operator and a clause, the clause comprising a second operator, the second operator being an operation to be performed on an intermediate result of execution of the operator; generating a query plan for the database command, the query plan having a first query node corresponding to the first operator, a second query node corresponding to a shared subplan; the second query node connected to both the first query node and a third query node corresponding to an aggregation operator corresponding to an aggregation operator related to the second operator; the third query node connected to a fourth query node corresponding to the second operator; assigning a first, second, and third query nodes to a first distributed node and the fourth query node to a second distributed node; executing, the first, second, and third query nodes on the first distributed node, the execution of the third query node causing output to be sent to the fourth query node; and executing the fourth query node on the second distributed node, causing output of the fourth query node to be sent to the entity.

In Example 13, the subject matter of Example 12 comprises, wherein the assigning comprises assigning a first instance of the first query node to a first distributed node and a second instance of the first query node to a second distributed node.

In Example 14, the subject matter of Examples 12-13 comprises, wherein the fourth query node stores the output of the fourth query node in a session variable that is accessible to the entity.

In Example 15, the subject matter of Examples 12-14 comprises, wherein the fourth query node sends the output of the fourth query node directly to the entity in a message that also contains output that is based on output of the first query node.

In Example 16, the subject matter of Examples 12-15 comprises, wherein the generating a query plan comprises: receiving a first version of the query plan having the first node, the first node comprising the first operator and the second operator; adding the second and third nodes to the first version of the query plan; and removing the second operator from the first node and placing it into the fourth node of the query plan.

Example 17 is a non-transitory machine-readable medium storing instructions which, when executed by one or more processors, cause the one or more processors to perform operations comprising: receiving a database command, from an entity, in a distributed database system, to be performed on one or more tables in a database, the database command comprising a first operator and a clause, the clause comprising a second operator, the second operator being an operation to be performed on every row of the one or more tables in the database; generating a query plan for the database command, the query plan having a first query node corresponding to the first operator, a second query node corresponding to a shared subplan; the second query node connected to both the first query node and a third query node corresponding to an aggregation operator corresponding to an aggregation operator related to the second operator; the third query node connected to a fourth query node corresponding to the second operator; assigning a first, second, and third query nodes to a first distributed node and the fourth query node to a second distributed node; executing, the first, second, and third query nodes on the first distributed node, the execution of the third query node causing output to be sent to the fourth query node; and executing the fourth query node on the second distributed node, causing output of the fourth query node to be sent to the entity.

In Example 18, the subject matter of Example 17 comprises, wherein the assigning comprises assigning a first instance of the first query node to a first distributed node and a second instance of the first query node to a second distributed node.

In Example 19, the subject matter of Examples 17-18 comprises, wherein the fourth query node stores the output of the fourth query node in a session variable that is accessible to the entity.

In Example 20, the subject matter of Examples 17-19 comprises, wherein the fourth query node sends the output of the fourth query node directly to the entity in a message that also contains output that is based on output of the first query node.

Example 21 is at least one machine-readable medium comprising instructions that, when executed by processing circuitry, cause the processing circuitry to perform operations to implement any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 6:
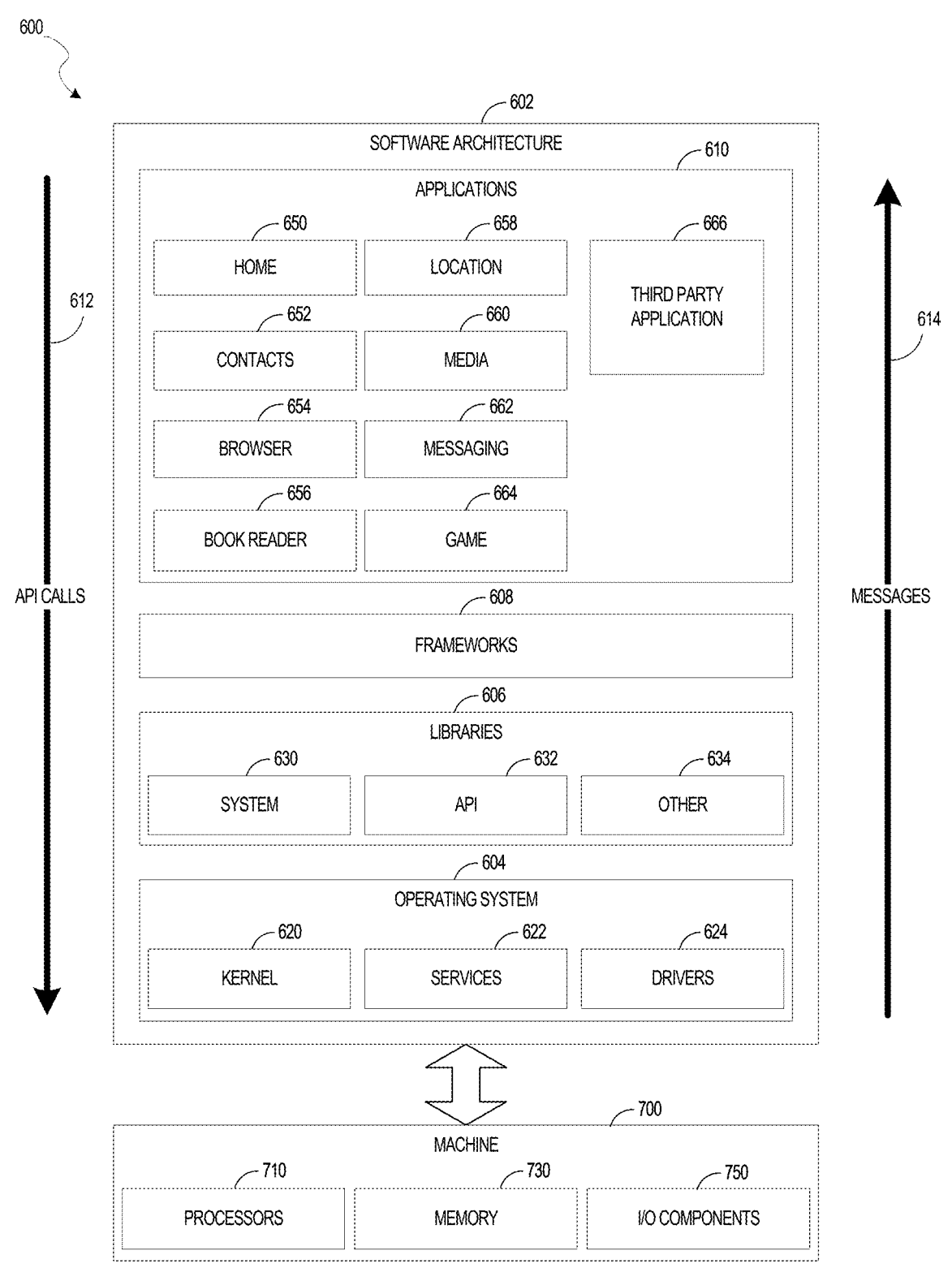
FIG. 6 is a block diagram illustrating a software architecture, in accordance with an example embodiment.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that comprises processors 710, memory 730, and input/output (I/O) components 750. In this example architecture, the software architecture 602 can be conceptualized as a stack of layers where each layer may provide a particular functionality. For example, the software architecture 602 comprises layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 comprises, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware. For instance, the drivers 624 can include display drivers, camera drivers, BLUETOOTH® or BLU-ETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (PEG or JPG), or Portable Network Graphics (PNG), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610. For example, the frameworks 608 provide various graphical user interface functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. The applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit [SDK] by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
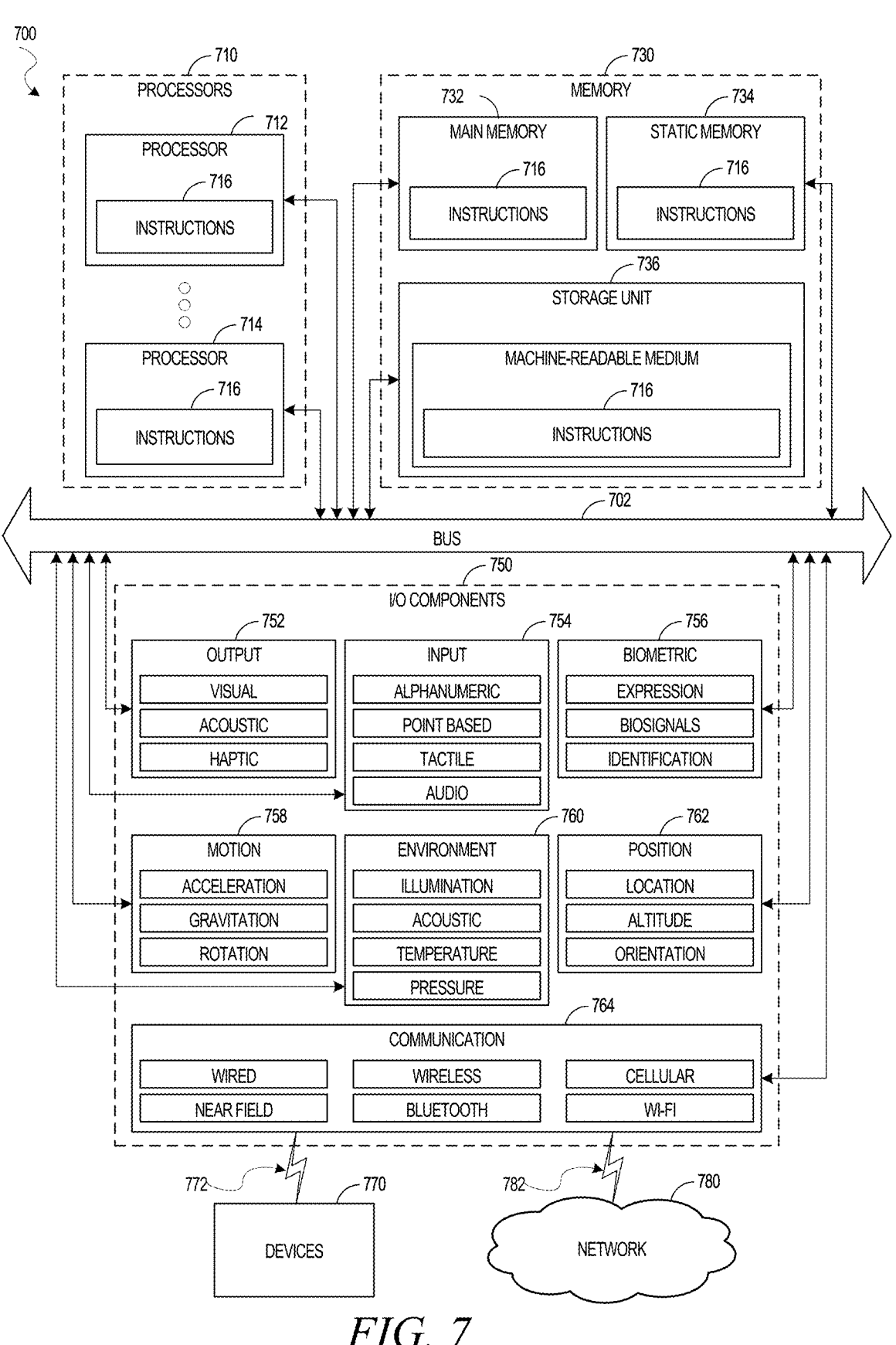
FIG. 7 illustrates a diagrammatic representation of a machine in the form of a computer system within which a set of instructions may be executed for causing the machine to perform any one or more of the methodologies discussed herein.

FIG. 7 illustrates a diagrammatic representation of a machine 700 in the form of a computer system within which a set of instructions may be executed for causing the machine 700 to perform any one or more of the methodologies discussed herein. Specifically, FIG. 7 shows a diagrammatic representation of the machine 700 in the example form of a computer system, within which instructions 716

(e.g., software, a program, an application, an applet, an app, or other executable code) for causing the machine 700 to perform any one or more of the methodologies discussed herein may be executed. For example, the instructions 716 may cause the machine 700 to execute the method of FIG. 5. Additionally, or alternatively, the instructions 716 may implement FIGS. 1-5 and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer [or distributed] network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device [e.g., a smart watch], a smart home device [e.g., a smart appliance], other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit [CPU], a reduced instruction set computing [RISC] processor, a complex instruction set computing [CISC] processor, a graphics processing unit [GPU], a digital signal processor [DSP], an application-specific integrated circuit [ASIC], a radio-frequency integrated circuit [RFIC], another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor 712), multiple processors 712, 714 with a single core, multiple processors 712, 714 with multiple cores, or any combination thereof.

The memory 730 may include a main memory 732, a static memory 734, and a storage unit 736, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel [PDP], a light-emitting diode [LED] display, a liquid crystal display [LCD], a projector, or a cathode ray tube [CRT], acoustic components [e.g., speakers]), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System [GPS] receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling

782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., coupled via a USB).

Moreover, the communication components 764 may detect identifiers or include components operable to detect identifiers. For example, the communication components 764 may include radio-frequency identification (RFID) tag reader components, NFC smart tag detection components, optical reader components (e.g., an optical sensor to detect one-dimensional bar codes such as Universal Product Code [UPC] bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (i.e., 730, 732, 734, and/or memory of the processor(s) 710) and/or the storage unit 736 may store one or more sets of instructions 716 and data structures (e.g., software) embodied or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780, may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., Hypertext Transfer Protocol [HTTP]). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor;
   a computer-readable medium storing instructions that, when executed by the at least one hardware processor, cause the at least one hardware processor to perform operations comprising:
   receiving a single database command expressed in a database query language, from an entity, in a distributed database system, to be performed on one or more tables in a database, the database command comprising a first operator and a clause, the clause comprising a second operator, the second operator in the database command being either a limit operator or an offset operator and additionally having a property indicating that an operation is to be performed on every row of a result of complete execution of the first operator, the first operator, second operator, and property all contained in the single database command prior to any query plan being generated on the single database command;
   generating a query plan for the database command, the query plan having a first query node containing the first operator, a second query node containing a shared subplan, the second query node directly connected to both the first query node and a third query node, the third query node containing an aggregation operator related to the second operator, the third query node connected to a fourth query node, the fourth query node containing the second operator;
   assigning the first, second, and third query nodes to a first distributed node and the fourth query node to a second distributed node;
   executing, the first, second, and third query nodes on the first distributed node, the execution of the third query node causing output to be sent to the fourth query node, the first query node being executed completely prior to the third query node being executed; and
   executing the fourth query node on the second distributed node, causing output of the fourth query node to be sent to the entity, the execution of the first, second, and third query nodes being performed such that the operation indicated in the property is performed on every row of the result of complete execution of the first operator and prior to the second operator being executed.

2. The system of claim 1, wherein the first operator is a select operator.

3. The system of claim 1, wherein the first operator is a group by operator.

4. The system of claim 1, wherein the first operator is a sort operator.

5. The system of claim 1, wherein the property is a total rowcount property.

6. The system of claim 1, wherein the assigning comprises assigning a first instance of the first query node to the first distributed node and a second instance of the first query node to the second distributed node.

7. The system of claim 1, wherein the fourth query node stores the output of the fourth query node in a session variable that is accessible to the entity.

8. The system of claim 1, wherein the fourth query node sends the output of the fourth query node directly to the entity in a message that also contains output that is based on output of the first query node.

9. The system of claim 1, wherein the generating a query plan comprises:
   receiving a first version of the query plan having the first node, the first node comprising the first operator and the second operator;
   adding the second and third nodes to the first version of the query plan; and
   removing the second operator from the first node and placing it into the fourth node of the query plan.

10. A method comprising:
   receiving a single database command expressed in a database query language, from an entity, in a distributed database system, to be performed on one or more tables in a database, the database command comprising a first operator and a clause, the clause comprising a second operator, the second operator in the database command being either a limit operator or an offset operator and additionally having a property indicating that an operation is to be performed on every row of a result of complete execution of the first operator, the first operator, second operator, and property all contained in the single database command prior to any query plan being generated on the single database command;

generating a query plan for the database command, the query plan having a first query node containing the first operator, a second query node containing a shared subplan, the second query node directly connected to both the first query node and a third query node, the third query node containing an aggregation operator related to the second operator, the third query node connected to a fourth query node, the fourth query node containing the second operator;

assigning the first, second, and third query nodes to a first distributed node and the fourth query node to a second distributed node;

executing, the first, second, and third query nodes on the first distributed node, the execution of the third query node causing output to be sent to the fourth query node, the first query node being executed completely prior to the third query node being executed; and executing the fourth query node on the second distributed node, causing output of the fourth query node to be sent to the entity, the execution of the first, second, and third query nodes being performed such that the operation indicated in the property is performed on every row of the result of complete execution of the first operator and prior to the second operator being executed.

11. The method of claim 10, wherein the assigning comprises assigning a first instance of the first query node to the first distributed node and a second instance of the first query node to the second distributed node.

12. The method of claim 10, wherein the fourth query node stores the output of the fourth query node in a session variable that is accessible to the entity.

13. The method of claim 10, wherein the fourth query node sends the output of the fourth query node directly to the entity in a message that also contains output that is based on output of the first query node.

14. The method of claim 10, wherein the generating a query plan comprises:

receiving a first version of the query plan having the first node, the first node comprising the first operator and the second operator;

adding the second and third nodes to the first version of the query plan; and removing the second operator from the first node and placing it into the fourth node of the query plan.

15. A non-transitory machine-readable medium storing instructions which, when executed by one or more processors, cause the one or more processors to perform operations comprising:

receiving a single database command expressed in a database query language, from an entity, in a distributed database system, to be performed on one or more tables in a database, the database command comprising a first operator and a clause, the clause comprising a second operator, the second operator in the database command being either a limit operator or an offset operator and additionally having a property indicating that an operation is to be performed on every row of a result of complete execution of the first operator, the first operator, second operator, and property all contained in the single database command prior to any query plan being generated on the single database command;

generating a query plan for the database command, the query plan having a first query node containing the first operator, a second query node containing a shared subplan, the second query node directly connected to both the first query node and a third query node, the third query node containing an aggregation operator related to the second operator, the third query node connected to a fourth query node, the fourth query node containing the second operator;

assigning the first, second, and third query nodes to a first distributed node and the fourth query node to a second distributed node;

executing, the first, second, and third query nodes on the first distributed node, the execution of the third query node causing output to be sent to the fourth query node, the first query node being executed completely prior to the third query node being executed; and executing the fourth query node on the second distributed node, causing output of the fourth query node to be sent to the entity, the execution of the first, second, and third query nodes being performed such that the operation indicated in the property is performed on every row of the result of complete execution of the first operator and prior to the second operator being executed.

16. The non-transitory machine-readable medium of claim 15, wherein the assigning comprises assigning a first instance of the first query node to the first distributed node and a second instance of the first query node to the second distributed node.

17. The non-transitory machine-readable medium of claim 15, wherein the fourth query node stores the output of the fourth query node in a session variable that is accessible to the entity.

18. The non-transitory machine-readable medium of claim 15, wherein the fourth query node sends the output of the fourth query node directly to the entity in a message that also contains output that is based on output of the first query node.

* * * * *